United States Patent [19]
Kato et al.

[11] Patent Number: 5,326,807
[45] Date of Patent: Jul. 5, 1994

[54] CONNECTOR

[75] Inventors: Tetsuo Kato; Masahiro Kanda, both of Shizuoka, Japan

[73] Assignee: Yazaki Corporation, Tokyo, Japan

[21] Appl. No.: 63,339

[22] Filed: May 19, 1993

[30]  Foreign Application Priority Data

May 29, 1992 [JP] Japan .................. 4-139028

[51] Int. Cl.$^5$ .................. C08K 5/09; C08K 3/16
[52] U.S. Cl. .................. 524/413; 524/227; 524/350
[58] Field of Search .................. 524/413, 538, 539

[56]  References Cited

U.S. PATENT DOCUMENTS

| | | | |
|---|---|---|---|
| 3,491,042 | 1/1970 | Heinz et al. | 524/413 |
| 4,292,194 | 9/1981 | Perazzoni et al. | 524/413 |
| 4,540,727 | 9/1985 | Vogdes | 524/413 |
| 4,600,741 | 7/1986 | Aycock et al. | 524/538 |
| 4,857,575 | 8/1989 | van der Meer et al. | 524/538 |
| 5,126,075 | 6/1992 | Nakagawa | 524/413 |
| 5,157,064 | 10/1992 | Gijsman | 524/413 |

FOREIGN PATENT DOCUMENTS

| | | | |
|---|---|---|---|
| 56-149430 | 11/1981 | Japan | C08G 69/28 |
| 56-149431 | 11/1981 | Japan | C08G 69/28 |

*Primary Examiner*—Kriellion S. Morgan
*Attorney, Agent, or Firm*—Sughrue, Mion, Zinn, Macpeak & Seas

[57] ABSTRACT

A connector comprising a housing comprising a resin composition comprising (A) 100 parts by weight of a 4,6-nylon resin, (B) from 80 to 120 parts by weight of a polyphenylene ether resin modified with an unsaturated organic acid compound, and (C) from 0.1 to 0.4 part by weight of a copper halide.

6 Claims, 2 Drawing Sheets

CONNECTOR

FIELD OF THE INVENTION

The present invention relates to a connector which is lightweight and is excellent in dimensional stability, heat resistance, mechanical properties, and productivity and also in fitting feeling.

BACKGROUND OF THE INVENTION

Connectors having various kinds of plastic housings (hereinafter, sometimes referred to simply as "connectors") have conventionally been used for connecting the circuits of electric and electronic instruments or devices for use in motor vehicles. With the recent progress in weight reduction in motor vehicles together with the production of lower-pollution motor vehicles, there is a growing demand for more lightweight connectors. Further, with the increase of the performance and function of motor vehicles, the connectors have come to be required to have a smaller size, more complicated form, improved heat resistance, and improved fitting feeling. The connectors are also required to have improved productivity.

Polybutylene terephthalate (PBT) resins, which are excellent in heat resistance, dimensional stability, and moldability, are used in conventional connectors in large quantities. However, these connectors have had a problem of large weight due to the high specific gravity of the PBT resins. Although 6-nylon resins and 6,6-nylon resins can be advantageously used in the weight reduction of connectors since these resins have lower specific gravities than PBT resins, the nylon resins have had a problem that they have a high water absorption and hence the connectors, upon water absorption, suffer a dimensional change and deterioration in mechanical properties. Thus, 6-nylon and 6,6-nylon resins are not suitable for use in the miniaturization, complication in form, and improvement in fitting feeling of connectors.

In addition to those resins, polypropylene (PP) resins, polyphenylene ether (PPE) resins, ABS resins, and other resins have also been used. Such resins, however, unsatisfactory because they are inferior in heat resistance, chemical resistance, fluidity, etc.

Although attempts are being made to reduce the weight of the connectors employing these resins by foaming, incorporation of a hollow filler or other means, such techniques have been defective in, for example, that the molding accuracy is insufficient and the deterioration of the mechanical properties is severe.

SUMMARY OF THE INVENTION

An object of the present invention is to solve the above-described problems of the conventional techniques and to provide a connector which is lightweight and is excellent in dimensional stability, heat resistance, mechanical properties, and productivity and also in fitting feeling.

Other objects and effects of the present invention will be apparent from the following description.

As a result of intensive investigations made by the present inventors in order to attain the above objects, it has been found that the above objects can be attained with a connector employing a housing formed by molding a resin composition obtained by mixing a 4,6-nylon resin with a specific resin and a specific metal salt in specific proportions and, preferably, further with a specific hindered phenolic compound. The present invention has thus been accomplished.

The present invention relates to a connector comprising a housing comprising a resin composition comprising (A) 100 parts by weight of a 4,6-nylon resin, (B) from 80 to 120 parts by weight of a polyphenylene ether resin modified with an unsaturated organic acid compound, and (C) from 0.1 to 0.4 part by weight of a copper halide.

The amount of the polyphenylene ether resin (B) is preferably from 90 to 120 parts by weight, and more preferably from 95 to 110 parts by weight. The amount of the copper halide (C) is preferably from 0.1 to 0.3 part by weight, and more preferably from 0.15 to 0.25 part by weight.

In a preferred embodiment of the present invention, the resin composition further comprises at least one selected from the group consisting of N,N'-hexamethylenebis(3,5-di-t-butyl-4-hydroxyhydrocinnamide) and 1,3,5-trimethyl-2,4,6-tris(3,5-di-t-butyl-4-hydroxybenzyl)benzene, so as to provide better results.

DETAILED DESCRIPTION OF THE INVENTION

Figure 1:
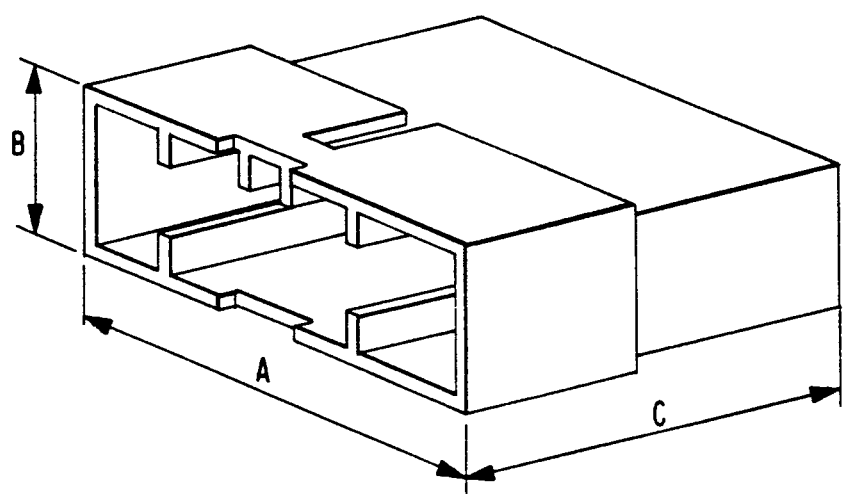
FIG. 1 is a slant view showing an external housing of the connector for motor vehicle obtained in the Example of the present invention.

Examples of the 4,6-nylon resin (A) contained in the resin composition used in the connector of the present invention include a polyamide obtained by the condensation reaction of adipic acid or a derivative thereof that functions as the acid, as an acid component, and tetramethylenediamine or a derivative thereof that functions as the amine, as an amine component. The polyamide includes those obtained by condensation reactions in which the acid component or the amine component was partly replaced with other co-monomer(s). Preferred examples of the 4,6-nylon resin include those described in JP-A-56-149430 and JP-A-56-149431. (The term "JP-A" as used herein means an "unexamined published Japanese patent application.)

It is preferred that the 4,6-nylon resin used in the present invention has an intrinsic viscosity as measured in m-cresol solvent at 35° C. of from 0.91 to 1.90, and more preferably from 1.10 to 1.50. Intrinsic viscosities more than 1.90 are not preferred in that the resin composition tends to have impaired processability to give moldings which not only have poor surface gloss but also vary in mechanical property and heat resistance. If the intrinsic viscosity of the resin is less than 0.91, the resin composition tends to disadvantageously have impaired mechanical strength.

Examples of the unsaturated organic acid compound-modified polyphenylene ether resin (B) contained in the resin composition used in the connector of the present invention include a modified polymer obtained by reacting a polyphenylene ether resin represented by formula (1):

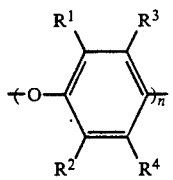

(1)

wherein n is an integer of 50 or more and $R^1$ to $R^4$ each represents a hydrogen atom, a halogen atom, or a monovalent hydrocarbon group, with an unsaturated compound.

The polyphenylene ether resin to be used as a raw material for such modified resin may be obtained by the polycondensation of a monocyclic phenol. Examples of the monocyclic phenol include 2,6-dimethylphenol, 2,6-diethylphenol, 2,6-dipropylphenol, 2-methyl-6-ethylphenol, 2-methyl-6-propylphenol, 2-ethyl-6-propylphenol, m-cresol, 2,3-dimethylphenol, 2,3-diethylphenol, 2,3-dipropylphenol, 2-methyl-6-ethylphenol, 2-methyl-3-propylphenol, 2-ethyl-3-methylphenol, 2-ethyl-3-propylphenol, 2-propyl-3-ethylphenol, 2,3,6-trimethylphenol, 2,3,6-triethylphenol, 2,3,6-tripropylphenol, and 2,6-dimethyl-3-propylphenol. The polyphenylene ether resin may be a homopolymer obtained from one of these monocyclic phenols, or may be a copolymer obtained from two or more thereof.

Specific examples of the polyphenylene ether resin include poly(2,6-dimethyl-1,4-phenylene ether), poly(2,6-diethyl-1,4-phenylene ether), poly(2,6-dipropyl-1,4-phenylene ether), poly(2-methyl-6-ethyl-1,4-phenylene ether), poly(2-methyl-6-propyl-1,4-phenylene ether), poly(2-ethyl-6-propyl-1,4-phenylene ether), copolymers of 2,6-dimethylphenol and 2,3,6-trimethylphenol, copolymers of 2,6-dimethylphenol and 2,3,6-triethylphenol, copolymers of 2,6-diethylphenol and 2,3,6-trimethylphenol, and copolymers of 2,6-diethylpropylphenol and 2,3,6-trimethylphenol. Among these, poly(2,6-dimethyl-1,4-phenylene ether) is preferably used in the present invention.

The polymerization degree of the polyphenylene ether resin is preferably 50 or more. If it is less than 50, the resin composition to be obtained tends to have insufficient mechanical properties.

The unsaturated organic acid compound-modified polyphenylene ether resin can be obtained by reacting the polyphenylene ether resin described above with an unsaturated organic acid compound. The unsaturated organic acid compound has at least one member selected from a carboxylic acid group, a carboxylic acid metal salt group, a carboxylic acid ester group, a carboxylic acid anhydride group, and a carboximide group, and further was at least one carbon-carbon double bond. The reaction may be conducted, if necessary in the presence of a free radical-generating compound.

Examples of the unsaturated organic acid compound for modification include unsaturated carboxylic acids and such derivatives thereof as esters, amides, and anhydrides. Specific examples thereof include maleic anhydride, maleic acid, funaric acid, maleimide, maleic hydrazide, a reaction product of maleic anhydride and a diamine, maleic acid amide, acrylic acid, crotonic acid, butenoic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, dococenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecaditrienoic acid, linolic acid, linolenic acid, octadecatrienoic acid, eicosadienoic acid, eicosatrienoic acid, eicosatetraenoic acid, ricinol acid, eleostearic acid, oleic acid, eicosapentaenoic acid, erucinic acid, docosadienoic acid, docosatrienoic acid, docosatetraenoic acid, docosapentaenoic acid, tetracosenoic acid, hexacosanoic acid, hexacodienoic acid, octacosanoic acid, traacontenoic acid, and esters, acid amides and anhydrides of the above-listed acids, as well as natural oils and fats such as soybean oil, sesame oil, rapeseed oil, peanut oil, camellia oil, olive oil, coconut oil, and sardine oil. These unsaturated organic acid compounds may contain, per molecule, two or more functional groups of the kind as specified hereinabove or two or more carbon-carbon double bonds. Further, two or more such unsaturated organic acid compounds may be used in combination to conduct the modification reaction.

As the free radical-generating compound which may be used in combination with the unsaturated organic acid compound, a compound known as free radical generator can be employed. The free radical generator employed preferably has a half-life sufficient to enable the generator to remain in an effective amount during the heat-melting of the polyphenylene ether resin. Examples of the free radical-generating compound include peroxides such as 2,4-dichlorobenzoyl peroxide, t-butyl peroxide, di(3,5,5-trimethylhexanol) peroxide, dilauroly peroxide, didecanoyl peroxide, dibenzoyl peroxide, t-butyl peroxy-2-ethylhexanoate, t-butyl peroxydiethylacetate, t-butyl peroxyisobutyrate, 1,1-di-t-butyl-peroxy-3,3,5-trimethylcyclohexane, t-butyl peroxyisopropylcarbonate, 1,1-di-t-butyl peroxy-3,3,5-trimethylhexoate, t-butyl peracetate, t-butyl perbenzoate, butyl 4,4-di-t-butylperoxyvalerianate, 2,2-di-t-butylperoxybutane, dicumyl peroxide, t-butyl cumyl peroxide, 1,3-di(t-butylperoxyisopropyl)benzene, diisopropylbenzene monohydroperoxide, cumol hydroperoxide, t-butyl hydroperoxide, p-methyl hydroperoxide, and pinane hydroperoxide; and highly branched compounds such as 2,3-dimethyl-2,3-diphenylbutane, 3,4-dimethyl-3,4-diphenylhexane, and 2,2,3,3-tetraphenylbutane. Among these free radical-generating compounds, 2,3-dimethyl-2,3-diphenylbutane is preferred in, for example, that it has high modification efficiency because the reaction begins at 200° C. or a higher temperature, and that it does not cause crosslinking nor gelation because it is less apt to attack the polymer vigorously.

In modifying the polyphenylene ether resin, the unsaturated organic acid compound described hereinabove and the free radical-generating compound may be used in amounts of from 0.05 to 10 parts by weight and from 0 to 2 parts by weight, respectively, per 100 parts by weight of the poly(phenylene ether) resin. If the amount of the unsaturated organic acid compound used is less than 0.05 part by weight, the modifying effect is so low that the resin composition obtained by blending this modified resin with a 4,6-nylon resin has impaired toughness. The amount of the unsaturated organic acid compound of larger than 10 parts by weight is not preferred in that the acid compound lowers the molecular weight of the polymer to impair the mechanical properties thereof. The amount of free radical-generating compound of larger than 2 parts by weight is not suitable in that not only the modifying effect cannot be heightened any more, but also side reactions such as polymer crosslinking occur to impair processability.

The modification reaction of a polyphenylene ether resin may be conducted by melt-kneading the above reactants by using a mixing machine (e.g., a super mixer or Henschel mixer), an extruder or the like. It is preferable that from the standpoint of uniformly conducting the modification reaction, the modification of the polyphenylene ether resin and pelleting be performed simultaneously by means of an extruder.

The amount of the unsaturated organic acid compound-modified polyphenylene ether resin to be blended with the 4,6-nylon resin for obtaining the resin composition for use in the present invention is from 80 to 120 parts by weight per 100 parts by weight of the 4,6-nylon resin. If the amount thereof is less than 80 parts by weight, water absorption by the 4,6-nylon resin cannot be prevented sufficiently. If the amounts thereof is larger than 120 parts by weight, it is undesirable because the heat resistance and moldability of the resin composition are impaired.

The copper halide (C) contained in the resin composition used for producing the connector of the present invention preferably is copper chloride or copper iodide, with copper iodide being more preferred. The copper halide is effective in enhancing the heat aging resistance of the 4,6-nylon resin. If incorporation of a copper halide is omitted, the resin composition is unable to be used as a molding article for connectors for motor vehicles to be used under extremely severe conditions. The amount of a copper halide to be incorporated is from 0.1 to 0.4 part by weight per 100 parts by weight of the 4,6-nylon resin. If the amount thereof is less than 0.1 part by weight, substantially no effect is produced on the improvement of heat aging resistance. Even if the amount thereof is increased beyond 0.4 part by weight, the effect is not heightened any more.

For the purpose of enhancing the effect of the copper halide, potassium iodide or the like may be used in combination therewith.

It is preferred to incorporate at least one of N,N'-hexamethylenebis(3,5-di-t-butyl-4-hydroxyhydrocinnamide) and 1,3,5-trimethyl-2,4,6-tris(3,5-di-t-butyl-4-hydroxybenzyl)benzene into the resin composition used in the present invention. These compounds are included in the substances generally known as hindered phenol compounds. However, a sufficient heat resistance-improving effect cannot be produced with phenolic antioxidants conventionally employed for imparting excellent heat resistance to resins, such as pentaerythrityl tetrakis(3-(3,5-di-t-butyl-4-hydroxyphenyl)propionate), octadecyl 3-(3,5-di-t-butyl-4-hydroyphenyl)propionate or the like. Only the specific compounds shown above bring about a significant improving effect.

The amount of the above at least one of N,N'-hexamethylenebis(3,5-di-t-butyl-4-hydroxyhydrocinnamide) and 1,3,5-trimethyl-2,4,6-tris(3,5-di-t-butyl-4-hydroxybenzyl)benzene to be incorporated is generally from 0.1 to 1.0 part by weight, preferably from 0.2 to 0.5 part by weight, per 100 parts by weight of the 4,6-nylon resin. If the amount thereof is less than 0.1 part by weight, the heat resistance-improving effect tends to be insufficient. If the amount thereof is larger than 1.0 part by weight, it is not preferred because the properties of the resin composition are impaired.

The resin composition for use in producing the connector of the present invention may contain polymers other than the essential polymers described above and various kinds of additives such as a stabilizer, pigment, flame retardant, release agent, and inorganic filler, as long as the these ingredients used do not defeat the object of the present invention.

The methods for producing the resin composition used in producing the connector of the present invention are not particularly limited. While any desired mixing method may be used, it is preferred to employ a method which can uniformly disperse each of the ingredients mixed. Examples of the mixing method include a method in which the ingredients are mixed together simultaneously or separately, and the mixture is homogenized with a mixing machine such as, for example, a blender, kneader, roll mill, or extruder. The thus-homogenized composition may be used as it is in a powder form, or may be used after being melt-kneaded and then pelleted.

The connector according to the present invention has a housing molded from the resin composition produced as described above. This molding can be conducted by a known technique, e.g., injection molding. The housing can be properly fabricated by appropriately selecting the number and form of poles into which connector terminals are to be inserted, the foden of a locking part, the foden of the housing part, etc. There are no particular limitations not only on the use of the connector but also on the kind, form, etc. thereof.

The present invention will be explained below in more detail with reference to the following examples, but the present invention is not construed as being limited thereto.

EXAMPLE 1

Production of polyphenylene ether resin

In a polymerization vessel was placed 500 parts by weight of a toluene solution containing 3.8 parts by weight of anhydrous cuprous chloride and 54.5 parts by weight of di-n-butylamine. Thereto was added 2 parts by weight of a 55% toluene solution of 2,6-xylenol. The contents were then stirred at 30° C. while oxygen was kept being bubbled thereinto, thereby to conduct oxidative polymerization. After completion of the polymerization, an aqueous acetic acid solution was added to terminate the reaction and the resulting reaction mixture was concentrated. Subsequently, methanol was added to the concentrate to precipitate a polymer, which was then recovered by filtration, washed, and dried to obtain a poly(phenylene ether) resin. This resin had an intrinsic viscosity of 0.49.

Modification of polyphenylene ether resin

The poly(phenylene ether) resin thus obtained was dried at 130° C. for 5 hours. Using a twin-screw vented extruder in which each screw had a diameter of 44 mm, 100 parts by weight of the dried polyphenylene ether resin was melt-kneaded at a cylinder temperature of 280° C. along with 0.6 part by weight of maleic anhydride and 0.1 part by weight of 2,3-dimethyl-2,3-diphenylbutane, and the resulting mixture was pelleted, thereby to obtain an unsaturated organic acid compound-modified polyphenylene ether resin.

Production of resin composition

A 4,6-nylon resin ("STANYL", manufactured by DSM Co.; intrinsic viscosity: 1.42) was dried at 110° C. under a reduced pressure of 10 Torr for 12 hours. 50 Parts by weight of the nylon resin was preliminary mixed uniformly with 50 parts by weight of the unsaturated organic acid compound-modified poly(phenylene ether) resin obtained above, 0.09 part by weight of copper iodide, and 0.39 part by weight of potassium iodide by means of a tumbling mixer. The mixture was melt-kneaded on a twin-screw vented extruder in which each screw had a diameter of 44 mm, with evacuation at a cylinder temperature of 300° C., screw rotational speed of 160 rpm, and discharge rate of 40 kg/h, and was then pelleted to obtain a resin composition for use in the present invention.

Production of connector housing

Figure 2:
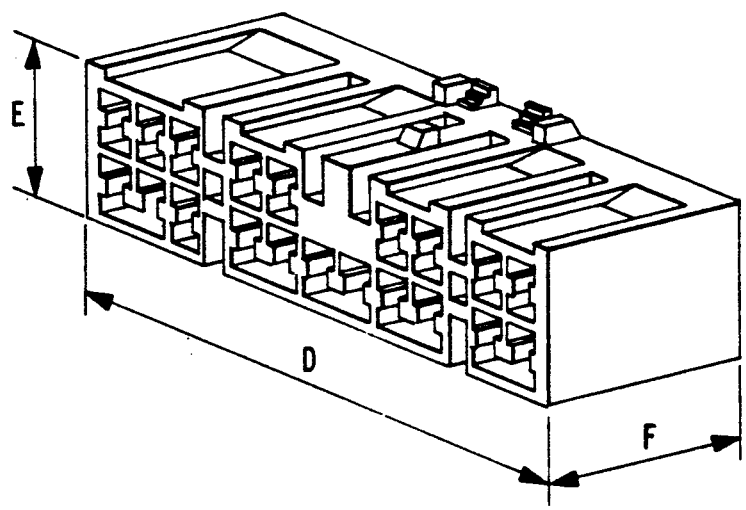
FIG. 2 is a slant view showing an internal housing of the connector for motor vehicle obtained in the Example of the present invention.

The thus-prepared resin composition was used to mold external and internal connector housings having the forms shown in FIGS. 1 and 2, respectively, using an injection molding machine ("IS55EN", manufactured by Toshiba Corp., Japan) under the following molding conditions, thereby to obtain a connector according to the present invention.

| (Injection Molding Conditions) | |
| --- | --- |
| Cylinder temperature: | 300° C. |
| Mold temperature: | 25° C. |
| Injection pressure: | 900 kgf/cm$^2$ |
| Injection speed: | intermediate |

The height, width, and depth (i.e., B, A, and C, respectively, in FIG. 1) of the external connector housings were 15.2 mm, 56.3 mm, and 36.0 mm, respectively, and the volume thereof was 11.63 cm$^3$. The height, width, and depth (i.e., E, D, and F, respectively, in FIG. 2) of the internal connector housings were 10.8 him, 52.3 mm, and 20.0 mm, respectively, and the volume thereof was 5.33 cm$^3$. In FIGS. 1 and 2, numeral 1 denotes an external housing and 2 denotes an internal housing.

EXAMPLE 2

A resin composition was obtained in the same manner as in Example 1 except that 0.2 part by weight of N,N'-hexamethylenebis(3,5-di-t-butyl-4-hydroxyhydrocinnamide) ("IRGANOX 1098", manufactured by Ciba-Geigy A.G.) was further added as a hindered phenol compound to the ingredients for the resin composition of Example 1. Connector housings were then molded from the resin composition in the same manner as in Example 1, thereby to obtain a connector according to the present invention.

EXAMPLE 3

A resin composition was obtained in the same manner as in Example 1 except that 0.2 part by weight of 1,3,5-trimethyl-2,4,6-tris(3,5-di-t-butyl-4-hydroxybenzyl)benzene ("IRGANOX 1330", manufactured by Ciba-Geigy A.G.) was further added as a hindered phenol compound to the ingredients for the resin composition of Example 1. Connector housings were then molded from the resin composition in the same manner as in Example 1, thereby to obtain a connector according to the present invention.

COMPARATIVE EXAMPLE 1

A resin composition was obtained in the same manner as in Example 1 except that the incorporation of copper iodide into the resin composition of Example 1 was omitted. Connector housings were then molded from this resin composition in the same manner as in Example 1, thereby to obtain a comparative connector.

COMPARATIVE EXAMPLE 2

Connector housings were molded in the same manner as in Example 1 except that a 6,6-nylon resin ("2020 UWi", manufactured by Ube Industries, Ltd., Japan) was used in place of the resin composition used in Example 1 and that the cylinder temperature was changed to 260° C. Thus, a comparative connector was obtained.

COMPARATIVE EXAMPLE 3

Connector housings were molded in the same manner as in Example 1 except that a polybutylene terephthalate resin ("1401-X08", manufactured by Toray Industries, Inc., Japan) was used in place of the resin composition used in Example 1 and that the cylinder temperature was changed to 260° C. Thus, a comparative connector was obtained.

Each of the connector housings obtained above was evaluated for the following properties and compared.

(1) Lightweight Property

The specific gravity of each housing was measured by the water displacement method.

(2) Dimensional Change by Water Absorption

Each housing was subjected to a moistening treatment under conditions of 35° C. and 95% RH until the water absorption reached saturation, and the changes of the dimensions of A, B, C, D, E, and F in FIGS. 1 and 2 were then measured. With respect to each of A to F, the degree of dimensional change (%) through the treatment based on the dimension immediately after molding was calculated using the following equation and evaluated.

Degree of dimensional change (%) = (A − B)/B × 100

Figure 3:
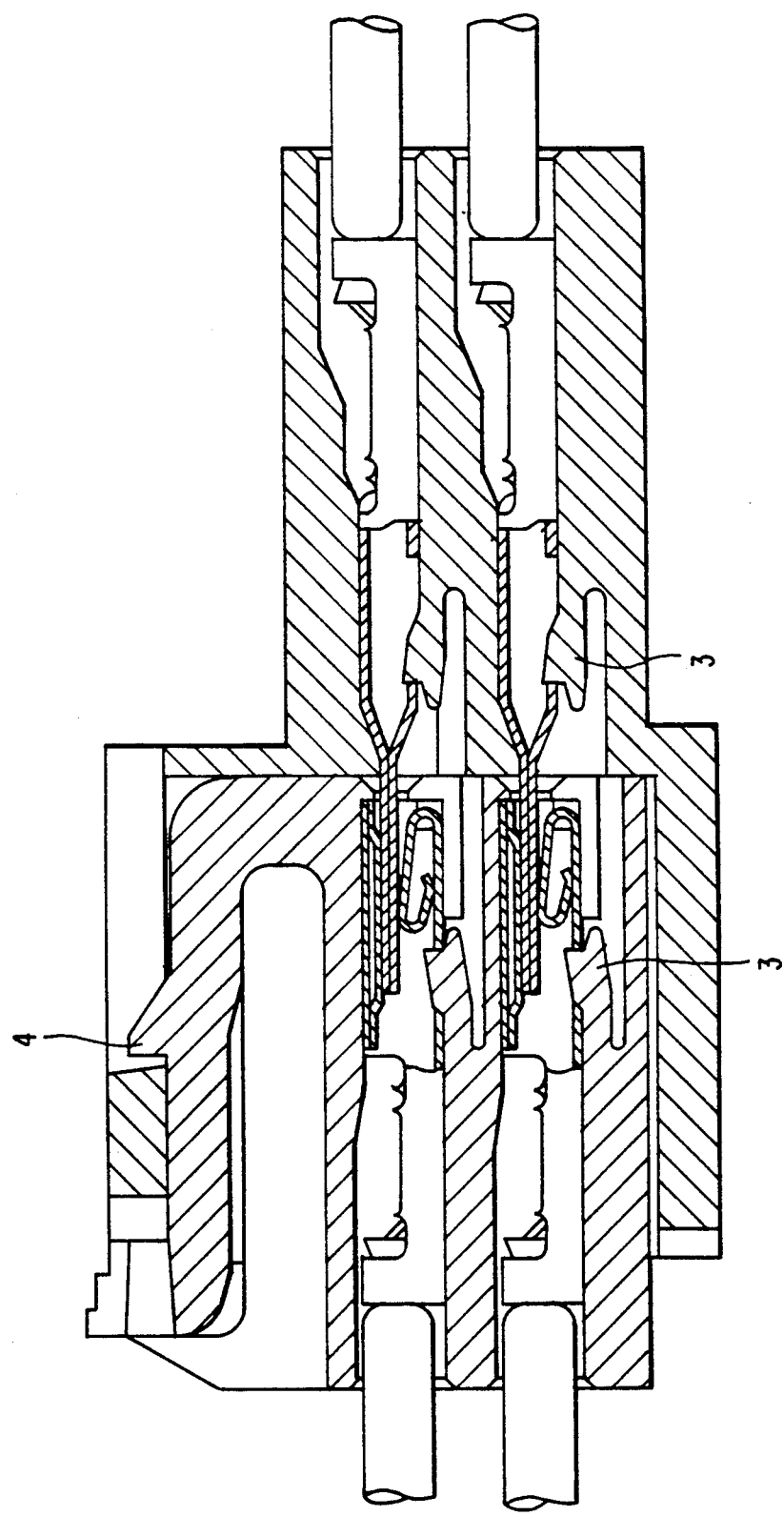
FIG. 3 is a cross sectional view showing a connector for motor vehicle produced in the Example of the present invention where an external and internal housings are fitted to each other.

A: Each dimension at saturation of water absorption
B: Each dimension immediately after molding (3) Heat Resistance Terminals each having welded thereto an electric wire about 100 nun long were fixed to housings that had heat-treated at 120° C. for 1,000 hours and also to housings immediately after molding, as shown in FIG. 3. In FIG. 3, numeral 3 denotes an engaging part for the housing and a terminal and 4 denotes an engaging part for the external and internal housings. Each electric wire was then pulled in the axial direction at a constant rate of about 100 mm/min, and the load (terminal holding strength) (kgf) at the time when the terminal was drawn from the fixing part 3 of the housing was measured. The housings were also examined for appearance change due to the heat treatment.

(4) Fitting Property

The housings were subjected to a moistening treatment under conditions of 35° C. and 95% RH until the water absorption reached saturation. Each external housing was then fitted to the corresponding internal housing in an anechoic chamber at a rate of 250 mm/min, and the sound pressure level of the fitting sound emitted from the fixing part 4 was measured with a noise meter. The sound pressure level data were further subjected to a frequency analysis using an analyzing recorder (manufactured by Yokogawa Hokushin Electric Corp., Japan) to evaluate the fitting property. Connectors having a high sound pressure level are regarded as good in fitting feeling or fitting property.

The results of the above evaluations are summarized in Tables 1, 2, and 3. In Tables 1 to 3, the term "initial" means "immediately after molding".

TABLE 1

Lightweight property and dimensional change by water absorption

|  | Specific gravity | Degree of dimensional change by water absorption (%) | | | | | |
| --- | --- | --- | --- | --- | --- | --- | --- |
|  |  | A | B | C | D | E | F |
| Example 1 | 1.11 | 0.458 | 0.549 | 0.437 | 0.426 | 0.520 | 0.309 |
| Example 2 | 1.11 | 0.423 | 0.544 | 0.412 | 0.424 | 0.489 | 0.321 |
| Example 3 | 1.11 | 0.424 | 0.503 | 0.420 | 0.413 | 0.500 | 0.311 |
| Comparative Example 1 | 1.11 | 0.447 | 0.537 | 0.439 | 0.432 | 0.512 | 0.300 |
| Comparative Example 2 | 1.14 | 1.035 | 1.159 | 1.088 | 1.271 | 1.092 | 0.958 |
| Comparative Example 3 | 1.31 | 0.082 | 0.024 | 0.067 | 0.045 | 0.023 | 0.056 |

TABLE 2

Heat resistance

| | Terminal-holding strength (kgf) | | | | |
| --- | --- | --- | --- | --- | --- |
| | Initial | | After heating | | |
| | External | Internal | External | Internal | Appearance after heating |
| Example 1 | 12.7 | 11.0 | 13.2 | 11.9 | slightly yellowed |
| Example 2 | 12.8 | 10.7 | 14.0 | 11.2 | unchanged |
| Example 3 | 12.8 | 11.0 | 13.5 | 11.6 | unchanged |
| Comparative Example 1 | 12.7 | 10.9 | 4.6 | 5.1 | browned cracked |
| Comparative Example 2 | 12.3 | 10.5 | 12.8 | 10.2 | browned |
| Comparative Example 3 | 8.5 | 8.4 | 8.9 | 8.7 | unchanged |

TABLE 3

Fitting property

| | Initial | | After water absorption | |
| --- | --- | --- | --- | --- |
| | Frequency (KHz) | Sound pressure (dB) | Frequency (KHz) | Sound pressure (dB) |
| Example 1 | 2.8 | 88 | 2.5 | 85 |
| Example 2 | 2.8 | 88 | 2.5 | 85 |
| Example 3 | 2.8 | 88 | 2.5 | 85 |
| Comparative Example 1 | 2.8 | 88 | 2.5 | 85 |
| Comparative Example 2 | 2.9 | 83 | 2.9 | 72 |
| Comparative Example 3 | 2.7 | 87 | 2.7 | 86 |

As shown in Tables 1, 2, and 3, it can be understood that the connectors of Examples 1 to 3 according to the present invention are low in specific gravity and excellent in lightweight property, have excellent dimensional stability to cause no problem concerning dimensional change due to water absorption during practical use, are excellent in mechanical properties and heat resistance, and give a sufficient fitting feeling, with the decrease in fitting property due to water absorption being very slight.

In contrast, the connector of Comparative Example 1 is defective in that it has considerably poor heat resistance and hence does not withstand practical use, although it is low in specific gravity and excellent in lightweight property and also has excellent dimensional stability to suffer less dimensional change upon water absorption. The connector of Comparative Example 2 is inferior in stability to dimensional change due to water absorption and in fitting property, although it is almost satisfactory in lightweight property. Further, the connector of Comparative Example 3 has a high specific gravity and is hence inferior in lightweight property, although excellent in dimensional stability, mechanical properties, heat resistance, and fitting property.

As described above, the connector of the present invention has the effects of being lightweight, suffering only little dimensional change upon water absorption, having high heat resistance and good mechanical properties, e.g., terminal-holding strength, giving extremely good fitting feeling, and having excellent productivity.

While the invention has been described in detail and with reference to specific embodiments thereof, it will be apparent to one skilled in the art that various changes and modifications can be made therein without departing from the spirit and scope thereof.

What is claimed is:

1. A connector comprising a housing comprising a resin composition comprising (A) 100 parts by weight of a 4,6-nylon resin, (B) from 80 to 120 parts by weight of a polyphenylene ether resin modified with an unsaturated organic acid compound, and (C) from 0.1 to 0.4 part by weight of a copper halide.

2. A connector as claimed in claim 1, wherein said resin composition further comprises at least one selected from the group consisting of N,N'-hexamethylenebis(3,5-di-t-butyl-4-hydroxyhydrocinnamide) and 1,3,5-trimethyl-2,4,6-tris(3,5-di-t-butyl-4-hydroxybenzyl)benzene.

3. A connector as claimed in claim 2, wherein the amount of said at least one selected from the group consisting of N,N'-hexamethylenebis(3,5-di-t-butyl-4-hydroxyhydrocinnamide) and 1,3,5-trimethyl-2,4,6-tris(3,5-di-t-butyl-4-hydroxybenzyl)benzene is from 0.1 to 1.0 part by weight per 100 parts by weight of said 4,6-nylon resin (A).

4. A connector as claimed in claim 1, wherein said 4,6-nylon (A) resin has an intrinsic viscosity as measured in m-cresol at 35° C. of from 0.91 to 1.90.

5. A connector as claimed in claim 1, wherein said polyphenylene ether resin modified with an unsaturated organic acid compound (B) is Poly(2,6-dimethyl-1,4-phenylene ether) modified with an unsaturated organic acid compound.

6. A connector as claimed in claim 1, wherein said copper halide (C) is copper chloride or copper iodide.

* * * * *